United States Patent [19]

Svala

[11] Patent Number: 4,458,112
[45] Date of Patent: Jul. 3, 1984

[54] FLOATING SUBSCRIBER LOOP INTERFACE CIRCUIT

[75] Inventor: Carl G. Svala, Norwalk, Conn.

[73] Assignee: Telefonaktiebolaget L M Ericsson, Stockholm, Sweden

[21] Appl. No.: 316,272

[22] Filed: Oct. 29, 1981

[51] Int. Cl.³ .................... H04M 3/22; H04M 19/00
[52] U.S. Cl. .......................... 179/18 FA; 179/170 D
[58] Field of Search ........ 179/16 AA, 18 FA, 170 D, 179/170 NC, 170 T; 370/32, 27, 24

[56] References Cited

U.S. PATENT DOCUMENTS

| | | | |
|---|---|---|---|
| 4,032,718 | 6/1977 | O'Neill | 179/170 NC X |
| 4,056,691 | 11/1977 | Freimanis et al. | 179/18 FA |
| 4,119,806 | 10/1978 | Baratin | 179/18 FA |
| 4,300,021 | 11/1981 | Van Husen | 179/18 FA |

FOREIGN PATENT DOCUMENTS 2071461  9/1981  United Kingdom ........... 179/170 D

Primary Examiner—Thomas W. Brown
Attorney, Agent, or Firm—Hane, Roberts, Spiecens & Cohen

[57] ABSTRACT

A telephone system is shown including subscriber loop interface circuits each for connecting a subscriber loop having a filter and a rectifier to a switching network of the system. The interface circuit includes a transformer having a primary winding, a secondary winding, and a sense winding. The primary winding is connected in series with a switching transistor whereby current pulses are fed into the primary winding. The secondary winding is connected to the filter and rectifier of the loop so that the current pulses are rectified to a DC current for the loop. An integrator including a current mirror feeding an integrating capacitor integrates each of the current pulses to give an integrated voltage. At the same time the voltage across the secondary winding is fed via a sense winding to a sample and hold circuit to generate a voltage which is compared against the voltage developed across the integrator. The output of the comparator is then used in conjunction with a clock pulse to turn on and off a flip-flop to control the width of the current pulses generated by the switching transistor. In addition thereto, circuitry is provided whereby voice signals from the switching network effectively modulate the current pulses fed through the primary winding of the transformer such that voice signals can be fed to the loop. Furthermore, the output of the sample and hold circuit is filtered to provide the transmission of voice signals from the loop to the switching network.

19 Claims, 1 Drawing Figure

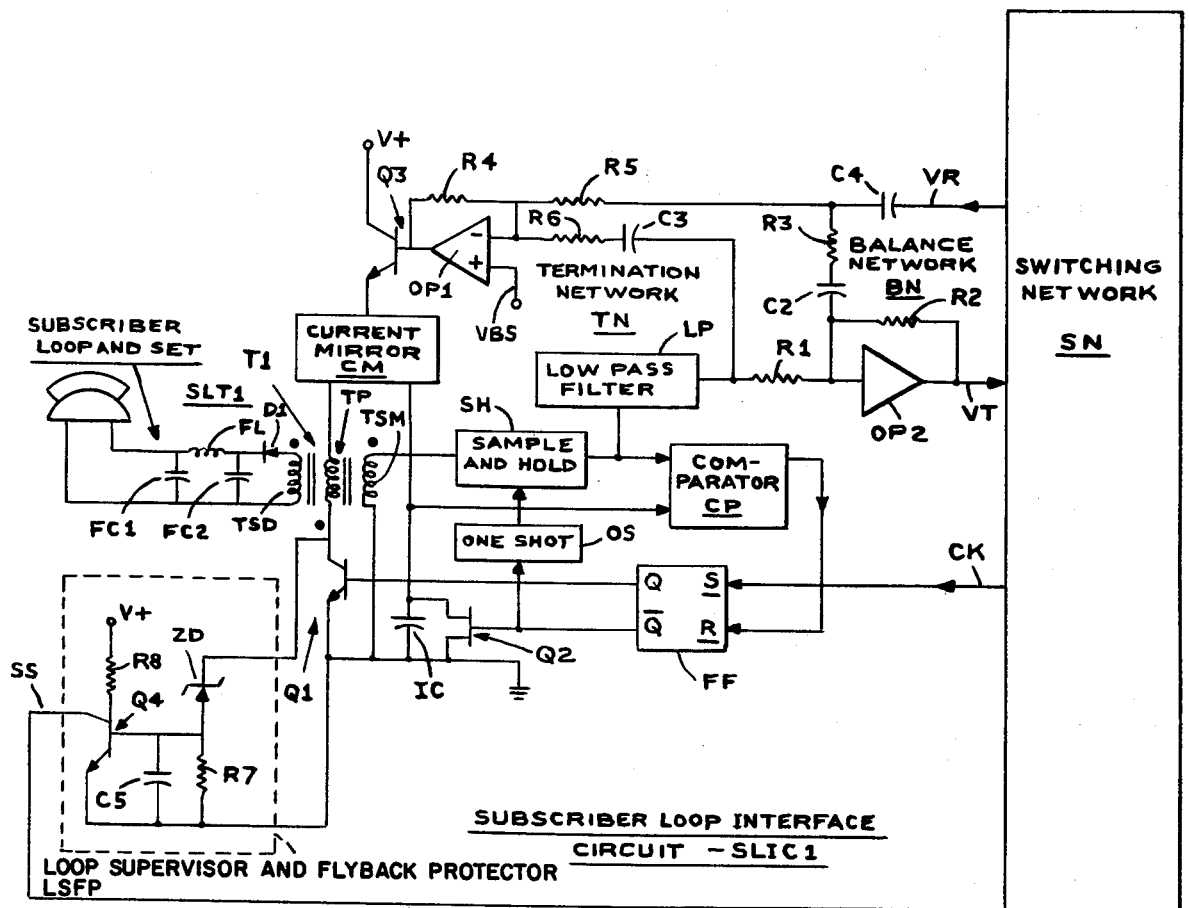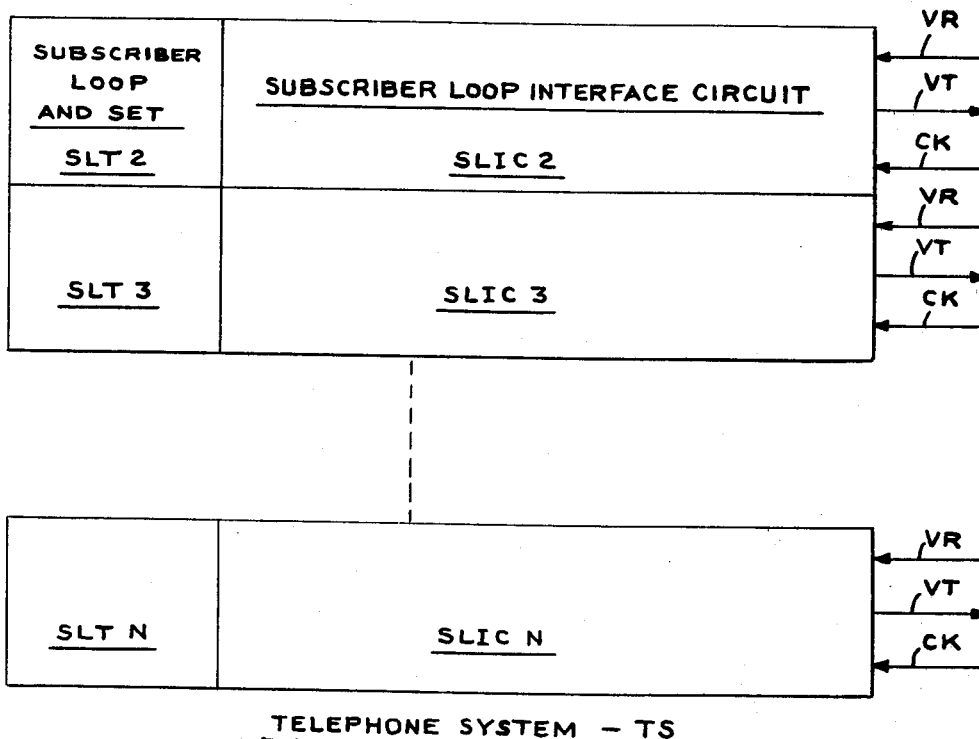

FLOATING SUBSCRIBER LOOP INTERFACE CIRCUIT

BACKGROUND OF THE INVENTION

This invention pertains to a telephone line interface circuit for use in a switching office and, more particularly, to a floating subscriber loop interface circuit which not only supplies the DC voltage for the loop but also through which passes the voice signals in both directions.

Since the advent of digital techniques more and more of the central offices in telecommunication systems are going completely digital and are doing away with any of the galvanic connections. Two of the basic building blocks in an interface have been completely integrated or, better, implemented with integrated circuits. In fact, these blocks, that is, the codec and the filter, are now offered as a single monolithic chip at a reasonable price. There now remains the miniaturization of the "battery supply" along with the circuits for the bi-directional transmission of voice signals (as well as the circuits for generating the ring signal). These circuits present several problems. For instance, such circuits must be protected against high voltage transients. In addition, they must be balanced with respect to the longitudinal currents caused by power frequency components capacitively coupled to the subscriber lines.

A step forward in the solution of the problem was made by the development of circuitry for providing a floating "battery supply" along with a transformer coupling for the voice signals. In particular, the battery supply was fed in parallel with the voice signals to the subscriber loop. Such a floating supply is described in U.S. Pat. Nos. 4,056,689 and 4,056,691. In such floating supply there was used a free-running transformer flyback oscillator which supplied the loop current. Thus, a portion of the interface circuit was miniaturized by the use of a small high frequency transformer and solid state circuitry. However, the coupling transformer with a large series capacitor for the voice signals was still used (and the ringing signals and the like also were in a parallel feed arrangement).

SUMMARY OF THE INVENTION

It is a general object of the invention to provide an improved subscriber line interface circuit.

It is another object of the invention to provide in such a circuit an improved "battery supply".

It is a still further object of the invention to provide such a circuit which does away with the voice coupling transformer and instead utilizes the transformer of the "battery supply".

Briefly, the invention contemplates a subscriber loop interface circuit for connecting a subscriber loop having a filter and a rectifier to a switching network which can be of the digital type. The interface circuit includes a transformer means having a primary winding and a secondary winding connected to the filter and rectifier means. Sensing means sense a representation of the loop voltage across the subscriber loop. This voltage is developed by feeding means which feed constant frequency current pulses through the primary winding of the transformer. Further means integrate each of the current pulses to produce voltage representing the time integral of the pulse. This voltage and the voltage across the subscriber loop are compared. In particular, the "integrated voltage" from each one of the current pulses is compared with the loop voltage before the occurrence of such one current pulse to control the duration of the current pulse. In this aspect of the invention, there is thus supplied a constant feed current to the subscriber loop, proportional to the supply voltage.

The invention further contemplates means for feeding current to the primary winding via a supply voltage source with the current being switched on and off. On the supply voltage source are superimposed voice signals from the exchange so that these voice signals are fed to the subscriber loop.

There is further contemplated the provision of low-pass filter means connected to the sensing means for transmitting to the switching network voice signals from the subscriber loop.

Therefore, the complete unit supplies both the DC loop current by utilizing the transformer as well as the transmission of voice signals in either direction through the transformer. Thus, the invention permits the deletion of one more transformers in the interface. However, the invention as well as the prior art assumes that the ringing signals and other associated signals are still fed in parallel to the loop.

DESCRIPTION OF THE DRAWING

Other objects, features and advantages of the invention will be apparent from the following detailed description when read in conjunction with the accompanying drawing whose sole FIGURE shows by way of an example, and not limitation, a presently preferred embodiment of the invention.

DESCRIPTION OF THE PREFERRED EMBODIMENT

The sole FIGURE shows a telephone system TS having a switching network SN connected to a plurality of subscriber loop and sets SLT1 to SLTN. Each of the connections is via a separate subscriber loop interface circuit such as the interface circuit SLIC1. A typical subscriber loop and set SLT1 includes a conventional telephone instrument connected via a two-wire conduit and a filter including the inductance FL and the parallel capacitors FC1 and FC2 and the series diode D1 are connected to the secondary winding of a transformer T1 which is part of the subscriber loop interface circuit SLIC1.

The remainder of the interface circuit SLIC1 centers around the transformer T1 having a primary winding connected between a conventional current mirror CM and the collector emitter path of transistor Q1 to ground. The base of transistor Q1 is connected to the Q-output of flip-flop FF. The set input S of the flip-flop is connected via line CK to a clock pulse source in the switching network SN (the clock pulse frequency is considerably higher than voice frequency). The transformer T1 includes a sense-winding TSM connected between ground and the input of a conventional sample and hold circuit SH. The sample and hold circuit is activated by a pulse from one shot multivibrator OS which is triggered by signals from the $\bar{Q}$-output of the flip-flop FF. The "one shot" is designed to emit a pulse of given duration when triggered by a positive going signal from the $\bar{Q}$-output of the flip-flop FF. The current mirror CM acts as a current source which feeds a scaled replica of the current through the primary winding to the integrating capacitor IC. The voltage across the integrating capacitor is compared with the voltage at the output of the sample and hold circuit SH by the comparator CP. When these voltages are equal the comparator CP feeds a pulse to the reset-input R of the flip-flop FF. In addition, the FET transistor Q2 is connected across the integrating capacitor IC and the gate electrode of the transistor Q2 is also connected to the Q-output of the flip-flop FF for discharging the capacitor.

In general, the circuit operates as follows to supply loop current to the subscriber loop. A clock pulse on the line CK from the switching network sets the flip-flop FF, turning on the transistor Q1, causing a current to build up through the primary winding TP to store energy in the magnetic field of the transformer T1. At the same time, the transistor Q2 is cut off and a proprotional current flows from the current mirror CM to the integrating capacitor IC, causing a voltage to build up thereacross. When the voltage across the capacitor IC equals the voltage stored in the sample and hold circuit SH from the previous cycle the comparator CP emits a pulse causing the resetting of the flip-flop FF. When the flip-flop FF resets, the transistor Q1 shuts off and the transistor Q2 turns on. In addition, the sample and hold circuit is opened to accept a new voltage sample in response to a pulse from "one shot" OS. At this time, the energy stored in transformer T1 causes the generation of a current through the diode D1, feeding the loop SLT1 with its associated line filter, at the same time a voltage proportional to the voltage then across the secondary winding TSM is fed to the sample and hold circuit. Thereafter with the occurrence of another clock pulse the cycle repeats itself. In this way, a constant DC current is developed for the "battery supply" by virtue of the diode and filter in the loop.

The remainder of the circuitry concerns the transmission of voice signals between the switching network SN and the subscriber loop and set SLT1. In general, a low-pass filter LP has an input connected to the sample and hold circuit SH. The output of the low-pass filter LP is connected via resistor R1 to the input of operational amplifier OP2, whose output is connected via the line VT to the switching network SN. Thus, any voice signals riding on the DC voltage of the subscriber loop are fed to the switching network SN. In particular, any voice signals generated by the subscriber instrument will enter the switching network in this manner.

Furthermore, voice signals from the switching network are fed via line VR and the resistor R5 to an input of the operational amplifier OP1. The output of this amplifier which is fed to the base of a transistor Q3 controls the current flow from a battery supply V+ to the current mirror CM. Thus, the operating voltage VBS to the current mirror CM is modulated with the voice signal.

To provide a proper terminating impedance towards the line there is provided a termination network TN consisting of the serially connected resistor R6 and capacitor C3 between the input of the operational amplifier OP1 and the output of the low-pass filter LP. There is also provided a balance network comprising the series circuit of resistor R3 and capacitor C2 connected between the input of the operational amplifier OP2 and the voice signal line VR from the switching network SN.

It should be noted that it may be preferable to place the low-pass filter LP at the input to the switching network SN to move it out of the secondary loops for stabilization reasons.

For several reasons, one being not to complicate the description with what is considered implementation details, no mention of circuitry to handle loop supervision has been made, nor have measures been taken to protect transistor Q1 (as well as the input to SH) against excessive collector voltage which would result during the fly-back period when the subscriber loop is opened. Both purposes could be handled with optional circuitry within the dotted rectangle and designated as loop supervisor and flyback protector LSFP. A Zener diode ZD is connected between the collector of transistor Q1 and a discharge network consisting of resistor R7 and capacitor C5 in parallel connected to the common ground. The voltage across the discharge network is also applied to the base of transistor Q4 having its emitter connected to ground. The collector of transistor Q4 is in series with resistor R8 connected to a suitable positive supply. The supervision signal SS reflecting the loop condition (open or closed) is derived from the collector of transistor Q4. The breakdown voltage of Zener diode ZD is selected to exceed the highest voltage appearing at the collector of transistor Q1 for the highest specified loop resistance. Resistor R7 and capacitor C5 are chosen to limit the base voltage of transistor Q4 to a value of the order of 0.5 V or less for the short voltage spikes appearing at the collector of transistor Q1 at the end of each conduction period due to the leakage inductance of transformer T1. Thus, transistor Q4 should not conduct during normal operation of a closed loop within specified limits. When the loop is opened, however, as a result of dial pulsing or at the end of conversation, such a high voltage will develop after a few cycles across the loop terminals that diode D1 will cease to conduct during the flyback periods. The energy stored in transformer T1 instead will be delivered to Zener diode ZD which must be rated to handle the corresponding power. A substantial rectified current will accordingly flow through Zener diode ZD, thus developing a voltage across the discharge network, forcing transistor Q4 to conduct. The base emitter junction of transistor Q4 will accordingly carry a current of the same order as the loop current, modified by the turns ratio of transformer T1. Transistor Q4 will saturate and the supervision signal SS will approach ground potential instead of the supply voltage level as an indication of the open loop condition.

This suggested implementation of the supervision function combined with protection against overvoltage during open loop conditions, is only an example of possible alternatives. For instance, a threshold detector may instead be connected at the VT terminal, as the voltage there includes a measure of the loop DC voltage in addition to the transmit audio signal. This DC voltage incidentally may be used for level regulation in conjunction with the codec-filter assembly to compensate for loop loss variations. If loop supervision is implemented at the VT terminal, separate means must be provided for the above-mentioned protection function, e.g., a Zener or clamping diode connected to a suitable point of transformer T1.

In order to limit the total power consumption in the SLIC when the subscriber line is idle, i.e., open, logic action may be taken, as is well known, as a result of the encountered low level supervision signal to reduce the clock rate or to send clock pulses in "bursts" in conjunction with the line scanning function.

There will now be given a theoretical discussion of the operation of the circuit.

It should be recognized that the transformer T1 and transistor Q1 form together with the rectifying diode in the secondary circuit a flyback converter device and that an ideal flyback converter acts as an energy transfer device. During the conduction period of transistor Q1 the primary current rises linearly from zero at a rate proportional to the applied voltage, in this case VBS modified by the drop across the current mirror CM and across the drive transistor Q1, and inversely proportional to the primary inductance. It may be noted that the linear current rise is matched by a corresponding growth of magnetic flux. At the end of this "charge period" magnetic energy with the amount $\frac{1}{2} L \, i_p^2$ is stored in the flyback transformer T1, where L is the primary inductance and $i_p$ is the primary current. When the drive transistor Q1 is switched off the flux change is reversed and a corresponding fast voltage reversal occurs simultaneously across all windings, forcing a current through the rectifying diode D1 into the filter FL, FC1 and FC2 and the attached subscriber line. The initial value of this current is equal to the final value of the primary current multiplied by the inverse turns ratio. The secondary current decreases linearly at a rate determined by the secondary voltage divided by the secondary inductance until it has reached zero and all stored magnetic energy has been delivered to the filter and the line.

Again, assuming an ideal, lossless system the power delivered to the flyback inverter $V_B \cdot I_B$, where $V_B$ is the available input voltage and $I_B$ is the average input current, should equal the product of line voltage and current, $V_L \cdot I_L$. Thus $I_L = V_B / V_L \cdot I_B$. Accordingly, at a constant pulse frequency and input voltage $V_B$, one could conceivably control the conduction period of the drive transistor to keep the ratio of $I_B / V_L$ constant and thus obtain constant line current $I_L$. However, the average input current $I_B$ can only be arrived at through an integration process which if extended over a longer period will result in a constant DC current to the line. In order to provide a constant current source also for voice frequencies the integration must be carried out very rapidly. It is a distinct feature of the invention to integrate the primary current over each individual cycle and to compare it with a sample of the line voltage obtained during the previous flyback cycle. For this purpose, in the shown embodiment, a fraction $K_2 \, i_p$ of the primary current is derived via the current mirror CM and integrated in capacitor IC. The resulting voltage is compared with a sample $K_1 V_L$ of the line voltage to determine the length of the conduction period for the drive transistor Q1.

Thus, $$\frac{1}{C} \int_0^{t_p} K_2 \, i_p \, dt = K_1 \, V_L.$$

The average primary current $$I_B = f \int_0^{t_p} i_p \, dt.$$

By substitution there is obtained $$V_L = \frac{K_2}{f \cdot C} \cdot I_B.$$

From the energy equivalence $$V_L \cdot I_L = V_B \cdot I_B.$$

Again, substituting $I_B$ from above:

$$V_L \cdot I_L = V_B \cdot K_1 / K_2 \cdot f \cdot C \cdot V_L$$

or $$I_L = K_1 / K_2 \cdot f \cdot C \cdot V_B.$$

The above equation verifies that a true constant current source can be established and also that the value of the current can be varied in proportion to $V_B$, other parameters being constant. This facilitates implementation of speech transmission through the proposed SLIC circuit. Thus a voice (audio) signal can be sent to the subscriber loop by superimposing this voice signal on the feed voltage $V_B$ to the flyback inverter.

The transmission of voice frequency signals generated in the subscriber's set through the floating subscriber loop interface circuit SLIC is also enhanced and facilitated by the constant current characteristics exhibited by the circuit thanks to the fast acting feed-back loop described above. Any such signal will appear across the input of the low-pass filter LP, only attenuated by the properties of the subscriber loop. The filter between the loop and the flyback inverter are dimensioned so that it has minimum loss for the desired voice band, still smoothing the "discharge" pulses from the inverter so that only an acceptable ripple level is forwarded to the loop.

Accordingly, the voice signal will also appear at the side of the filter which faces the secondary winding TSD of the inverter, including the rectifying diode D1. As a result the sample voltage taken from the sense winding TSM by the sample and hold circuit SH will include any voice signal at the line terminals, whether it is emitted by the subscriber set or received from the switching network SN and forwarded to the line as described above.

Of course the sample voltage will include a ripple component resulting from the "discharge" pulses delivered by the flyback inverter to the filter. However, this ripple waveform as caused by the DC current delivered to the line is uniform cycle to cycle and as a result the output from the sample and hold circuit SH contains a relatively constant ripple with reduced amplitude, corresponding to the voltage rise across the filter during the sampling period alone, which in the present embodiment is only a fraction of the total discharge cycle. This remaining ripple is filtered, e.g. in an active filter LP connected to the output of the sample and hold circuit. The signal delivered by this filter therefore faithfully reproduces the audio signal present at the line terminals of the line filter.

From this reasoning it should be understood how also speech transmission from the line to the switching network can be accomplished according to the invention. Experimentally it has been verified that this indeed is possible with low distortion and with a relative output level substantially independent of loop resistance, e.g. less than 1 dB variation for a variation of loop resistance between 400 ohms and 1400 ohms. The same is true for the transmission from the exchange to the line.

The basic mechanism of speech (audio) transmission in both directions through the floating subscriber line interface circuit SLIC has been explained, based upon a primary dynamic feedback loop controlling the flyback converter so that it acts as a constant current source to the line both for DC and voice frequency.

In order to ensure satisfactory voice transmission it is, however, essential to terminate the line in an impedance simulating the loop impedance, in order to minimize echo effects due to reflection of the audio signal at the interface. If the total delay subscriber-to-subscriber is short, in the order of milliseconds, the reflections are not perceived as echos but rather as an uneven frequency response. Reflections due to improper termination of the subscriber line may also adversely affect the two-to-four wire conversion which is necessary in conjunction with the SLIC when the associated switching system uses PCM transmission, for an example, or any other transmission method which requires transition to four wire. Eventually conversion to four wire transmission is mandatory at some point for long distance connections.

A simple way to terminate the line would be to connect a terminating impedance, e.g., a 900 ohm resistor in series with a 2 microfarad capacitor directly across the line terminals. Such an arrangement would, however, be a waste of signal energy, especially when transmitting a received signal from the switching network to the subscriber line. It would also require a bulky and relatively expensive capacitor. A more satisfactory method is to generate a terminating impedance by a feed-back arrangement within the subscriber line interface circuit.

Thus the present embodiment includes an arrangement to superimpose a received voice signal on the current sent to the loop. For this purpose the operational amplifier OP1 followed by an emitter follower amplifier Q3 is shown which will amplify the received signal with a factor $R_4/R_5$, adding the amplified and inverted signal to the output voltage equal to the bias voltage VBS connected to its non-inverting input. The audio portion of the sensed line voltage, obtained from the sample and hold circuit SH, is filtered in the low-pass filter LP, which for practical purposes may be an active filter. A network designated termination network(resistor R6 and capacitor C3) is connected between the output of the filter LP and the inverting input of operating amplifier OP1. This network basically is a scaled version of the desired terminating impedance. The function is as follows: The recovered audio portion of the line voltage is impressed on the termination network TN, thus generating an input current to amplifier OP1 inversely proportional to the impedance of the network (note that the inverting input from an AC point of view constitutes a node, i.e. a low impedance point). A corresponding, inverted voltage will result at the output of amplifier OP1. This voltage is added to $V_B$ and will generate a superimposed AC current to the line according to the transfer function $I_L = K_1/K_2 \cdot f \cdot C \cdot V_B$ already derived.

Accordingly, at the loop terminal an AC current is developed, proportional to the AC line voltage and inversely proportional to the impedance of the termination network TN. This current clearly will simulate a real terminating network across the line terminals equal to the termination network in this secondary feed-back loop with a scaling factor determined by $K_1$, the gain or loss in the filter, the value of resistor R4 and the transfer admittance $K_1/K_2 \cdot f \cdot C$ (in principle real, i.e. a conductance). A deviation from the above, simplified relationship is present. As expected the simulated terminating impedance is influenced by the phase shift in the filter following the sample and hold circuit.

Two alternate remedies can be applied:
1. To modify the termination network so that the effect of the phase shift is compensated for.
2. To derive the input voltage to the network directly from the sample and hold circuit.

Method 2 is preferred, as the first alternative probably will cause realization problems.

The apparent disadvantage of method 2, the inclusion of an unfiltered ripple component in the feedback path, should not necessarily cause a problem as long as it does not create distortion or intermodulation in amplifier OP1, as the ripple component will have a nearly constant phase relationship to the timing of the "charge" period where $V_B$ is affecting the inverter performance.

It has already been mentioned that the line voltage $V_L$ and the corresponding recovered output voltage from the active filter will contain audio (voice frequency) components not only originating from the subscriber set but also resulting from the AC current sent to the line as a result of an incoming voltage on the VR lead. This is a common, well-known problem which in conventional realizations is handled by a hybrid transformer arrangement. As is also well known in the art it can in an electronic SLIC be handled by a subtraction method where a signal proportional to VR is subtracted from the sensed voltage derived from the sample and hold circuit.

This can conveniently be done with the aid of operational amplifier OP2 inserted in the transmit path. In a similar way to the one described for generating a virtual terminating impedance, a current is added to the input of amplifier OP2 which is defined by the voltage on the line VR divided by the impedance of the balancing network BN. Again, this balancing network should be a scaled version of a conventional balancing network simulating the impedance of the line terminated in the subscriber instrument.

However, the phase shift of the filter involved, both the filter between the transformer T1 and the loop, and the filter LP, can detract from the desirable cancellation of the VR component derived from the line. This situation can conceivably also be improved by performing the subtraction before, not after, the filter in the sense path. The effect of the line filter cannot be eliminated in this way, however. It must instead be considered in the realization of the balancing network shown.

While only one embodiment of the invention has been shown and described in detail, other arrangements are possible. For example, a different configuration of the primary flyback circuit with the switching transistor for example inserted between the primary winding and the supply, possibly combined with the modulation circuitry associated with amplifier OP1, would permit grounding of one terminal of the primary winding. Then the sensing of the line voltage could be made across the primary winding or from a tap on it, obviating a separate sense winding. This advantage must however be weighed against the disadvantage of possibly more complex circuitry to control the operation of the switching transistor.

For integration of the primary current pulses to the flyback transformer the relatively simple combination of a current mirror and a capacitor can be replaced by a conventional integrator circuit using an operational amplifier with a capacitor in the feedback path and an input series resistor sensing the voltage drop across another series resistor, e.g. in the emitter circuit of the flyback drive transistor.

The timing of the sampling may be modified to include for example a small initial delay after the start of the flyback discharge cycle, this in order to sense the relatively flat maximum voltage appearing across the secondary winding (and the input to the line filter) during the discharge cycle. Thus the ripple at the output of the sample and hold circuit might be further reduced.

What is claimed is:

1. A subscriber loop interface circuit for connecting a subscriber loop and set to a switching network comprising: a transformer means having a primary winding and a secondary winding including rectifier and filter means connected to the subscriber loop; sensing means including a sense winding in said transformer means; switching means for feeding current pulses having a given frequency very much greater than the operating frequency of the subscriber loop through said primary winding; control means connected to said sensing means for controlling a characteristic of the current pulses via said switching means in accordance with the voltage across said secondary winding following the termination of a primary current pulse; and low-pass filter means connected to said sensing means for transmitting voice signals, generated by the subscriber set onto the subscriber loop as a superimposed signal on the voltage across said secondary winding, to the switching network.

2. The subscriber loop interface circuit of claim 1 further comprising modulating means for modulating another characteristic of the current pulses in accordance with voice signals received from the switching network whereby representations of said voice signals are fed to the subscriber loop and set via said transformer means.

3. The subscriber loop interface circuit of claim 1 or 2 wherein said switching means comprises a source of operating voltage connected to one end of said primary winding, a transistor means having output and reference terminals connecting the other end of said primary winding to a reference voltage and a control terminal, and a source of constant frequency pulses connected to said control terminal.

4. The subscriber loop interface circuit of claim 1 or 2 wherein said control means comprises means for generating a voltage related to the duration of a current pulse, means generating a voltage proportional to the voltage across said secondary winding before the occurrence of said current pulse, and comparing means for emitting a pulse for terminating the current pulse when said voltages are equal.

5. The subscriber loop interface circuit of claim 4 further comprising a source of constant frequency pulses, a flip-flop means which is switched to a first state in response to a pulse from said source and is switched to a second state in response to a pulse from said comparison means, and output means for generating constant frequency pulses of variable duration.

6. The subscriber loop interface circuit of claim 5 wherein said switching means comprises a source of operating voltage connected to one end of said primary winding, a transistor means having output and reference terminals connecting the other end of said primary winding to a reference voltage and a control terminal connected to said output means for generating constant frequency pulses of variable duration.

7. The subscriber loop interface circuit of claim 4 wherein said means for generating a voltage porportional to the voltage across said secondary winding is a sample and hold means periodically triggered by pulses derived from said constant frequency pulses.

8. The subscriber loop interface circuit of claim 7 further comprising means for connecting said low-pass filter means to the output of said sample and hold means.

9. The subscriber loop interface circuit of claim 3 comprising control means for controlling the amplitude of the operating voltage in accordance with voice signals received from the switching network.

10. The subscriber loop interface circuit of claim 3 comprising control means for controlling the amplitude of the operating voltage in accordance with the signal from said low-pass filter means.

11. The subscriber loop interface circuit of claim 3 comprising control means for controlling the amplitude of the operating voltage in accordance with voice signals received from the switching network and in accordance with the signal from said low-pass filter means.

12. A subscriber loop interface circuit for connecting a subscriber loop which has a loop voltage with a filter and rectifier means to a switching network comprising: a transformer means having a primary winding and a secondary winding connected to said filter and rectifier means; sensing means for sensing a representation of the loop voltage across the subscriber loop; feeding means for feeding constant frequency current pulses through said primary winding; integrating means for integrating each constant frequency current pulse to produce an integrated voltage; and comparing means for comparing the integrated voltage from one current pulse with the loop voltage sensed before the occurrence of said one current pulse to control the duration of said current pulse.

13. The subscriber loop interface circuit of claim 12 wherein said feeding means comprises a supply voltage connected to one end of said primary winding and a periodically operating switching means connected to the other end of said primary winding; and further comprising means for controlling said supply voltage whereby voice signals are fed to the subscriber loop.

14. The subscriber loop interface circuit of claim 12 or 13 further comprising low-pass filter means connected to said sensing means for transmitting to the switching network voice signals on said subscriber loop.

15. The subscriber loop interface circuit of claim 14 further comprising modulating means and termination network means for connecting the output of said low-pass filter means to said modulating means.

16. The subscriber loop interface circuit of claim 15 further comprising operational amplifier means for transmitting voice signals to the switching network connected to the output of said low-pass filter means and a balancing network connected to the input of said operational amplifier means for receiving voice signals from the switching network.

17. A subscriber loop interface circuit for connecting a subscriber loop and set to a switching network comprising: a transformer means having a primary winding and a secondary winding including rectifier and filter means connected to the subscriber loop; sensing means connected to said transformer means; switching means for feeding current pulses having a given frequency very much greater than the operating frequency of the subscriber loop through said primary winding; control means connected to said sensing means for controlling a characteristic of the current pulses via said switching means in accordance with the voltage across said secondary winding following the termination of a primary current pulse; and connecting means connected to said sensing means for transmitting voice signals, generated by the subscriber set onto the subscriber loop as a superimposed signal on the voltage across said secondary winding, to the switching network.

18. The subscriber loop interface circuit of claim 17 wherein said connecting means is lowpass filter means.

19. A subscriber loop interface circuit for connecting a subscriber loop having a loop voltage with a filter and rectifier means to a switching network comprising: a transformer means having a primary winding and a secondary winding connected to said filter and rectifier means; sensing means for sensing a representation of the loop voltage across the subscriber loop; feeding means for feeding constant frequency current pulses through said primary winding; means for integrating each constant frequency current pulse to produce an integrated voltage; comparing means for comparing the integrated voltage from one current pulse with the loop voltage sensed before the occurrence of said one current pulse to control the duration of said current pulse; and means connected to said sensing means for transmitting voice signals.

* * * * *